United States Patent
Vora et al.

(10) Patent No.: US 6,849,353 B2
(45) Date of Patent: Feb. 1, 2005

(54) POLYGONAL FUEL CELL APPARATUS AND METHOD OF MAKING

(75) Inventors: Nishith Pramod Vora, Niskayuna, NY (US); Ronald Scott Bunker, Niskayuna, NY (US); Lester Russell Hale, Scotia, NY (US); George Charles Goodman, Schenectady, NY (US); Debashis Dey, Waterford, NY (US)

(73) Assignee: General Electric Company, Niskayuna, NY (US)

(*) Notice: Subject to any disclaimer, the term of this patent is extended or adjusted under 35 U.S.C. 154(b) by 398 days.

(21) Appl. No.: 10/063,211

(22) Filed: Mar. 29, 2002

(65) Prior Publication Data

US 2003/0186100 A1 Oct. 2, 2003

(51) Int. Cl.[7] .............................................. H01M 8/10
(52) U.S. Cl. ......................................................... 429/31
(58) Field of Search ...................................... 429/30, 31

(56) References Cited

U.S. PATENT DOCUMENTS

| | | | |
|---|---|---|---|
| 4,490,444 A | | 12/1984 | Isenberg ....................... 429/31 |
| 4,876,163 A | | 10/1989 | Reichner ....................... 429/30 |
| 5,258,240 A | * | 11/1993 | Di Croce et al. .............. 429/31 |
| 5,273,838 A | * | 12/1993 | Draper et al. .................. 429/31 |
| 5,543,241 A | * | 8/1996 | Nishioka et al. .............. 429/39 |

FOREIGN PATENT DOCUMENTS

WO 0141239 6/2001

OTHER PUBLICATIONS

Fuel Cell Handbook, EG&G Services Parsons, Inc., US Dept of Energy, Morgantown, WV, Oct. 2000 PP. 8–1–8–11.

* cited by examiner

*Primary Examiner*—Patrick Ryan
*Assistant Examiner*—Thomas H. Parsons
(74) *Attorney, Agent, or Firm*—Patrick K. Patnode; Christian G. Cabou

(57) ABSTRACT

In one embodiment of the present invention, a polygonal fuel cell comprises: a cathode layer having a tubular shape; a contact layer electrically coupled to and disposed on the cathode layer to leave an uncovered cathode surface portion; an electrolyte layer disposed on the uncovered cathode surface portion; and an anode layer electrically isolated from the contact layer, disposed on the electrolyte layer such that the polygonal fuel cell has a polygonal cross section to facilitate dense packing.

24 Claims, 7 Drawing Sheets

US 6,849,353 B2

POLYGONAL FUEL CELL APPARATUS AND METHOD OF MAKING

BACKGROUND OF INVENTION

The present invention relates generally to the field of fuel cells and more specifically to fuel cells with polygonal cross-sections.

In a wide variety of applications, fuel cells are used to provide relatively cleaner and higher efficiency electrical power compared to fossil fuel burning electrical power plants.

Two design geometries have come to dominate the fuel cell field: the flat plate design and the circular tubular design (see, for example, Fuel Cell Handbook (Fifth Edition), Chapter 8, EG&G Services, available from National Technical Information Service, U.S. Department of Commerce, Springfield, Va.). The flat plate design has an advantage of high power density but suffers a disadvantage of being difficult to seal against gas leakage. Conversely, the circular tubular design offers the benefit of a more reliable gas seal, but at the cost of a reduced power density. An opportunity exists, therefore, to design a new fuel cell geometry which will retain the gas sealing performance of the circular tubular design while approaching the power density of the flat plate design.

SUMMARY OF INVENTION

The opportunity described above is addressed, in one embodiment of the present invention, by a polygonal fuel cell comprising: a cathode layer having a tubular shape; a contact layer electrically coupled to and disposed on the cathode layer to leave an uncovered cathode surface portion; an electrolyte layer disposed on the uncovered cathode surface portion; and an anode layer electrically isolated from the contact layer and disposed on the electrolyte layer such that the polygonal fuel cell has a polygonal cross section.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
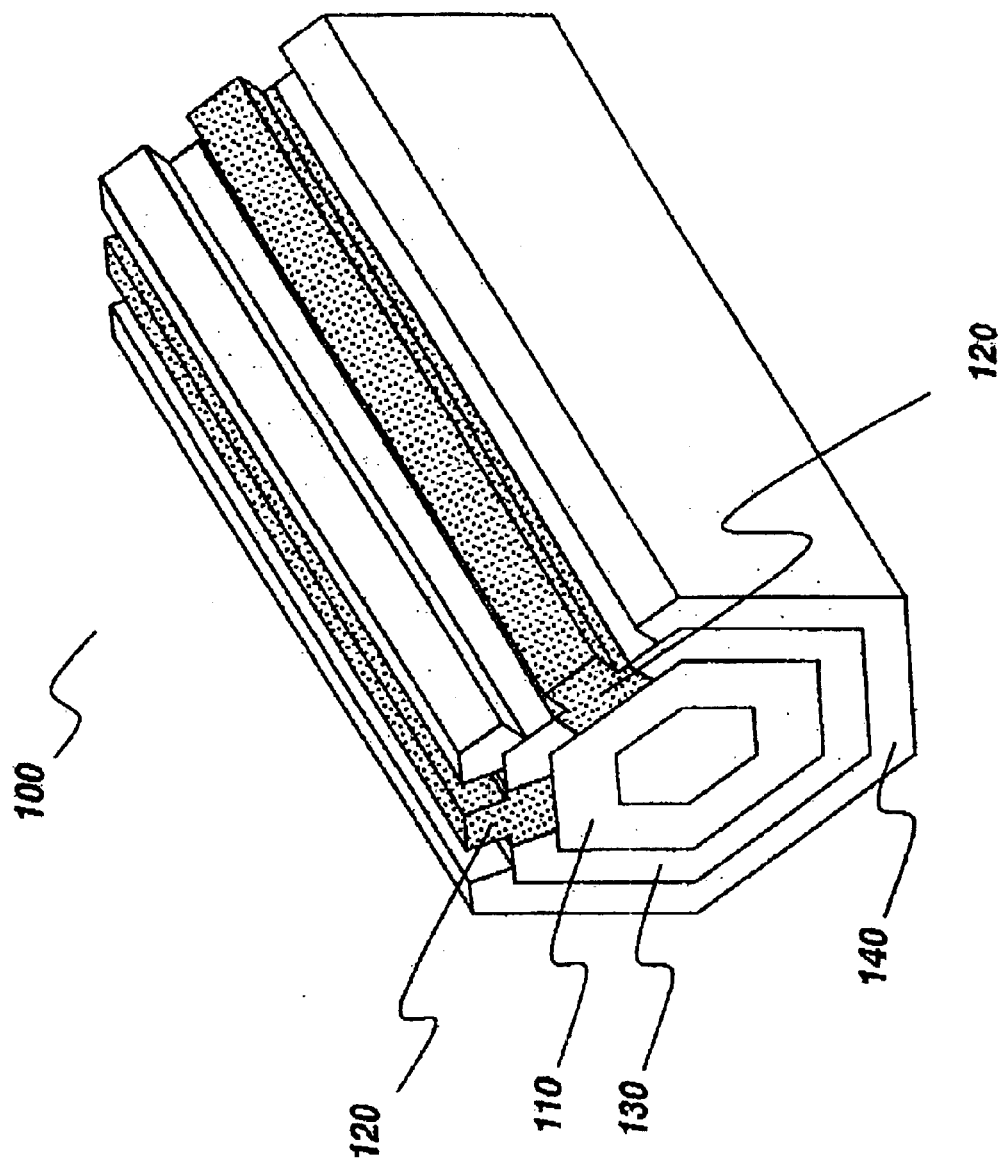
FIG. 1 illustrates an isometric projection of a polygonal fuel cell in accordance with one embodiment of the present invention.

In accordance with one embodiment of the present invention, FIG. 1 illustrates an isometric projection of a polygonal fuel cell 100 comprising a cathode layer 110, a contact layer 120, and an anode layer 140. Cathode layer 110 has a tubular shape through which an oxidant gas flows in operation. Contact layer 120 is electrically coupled to cathode layer 110 to provide an external electrical contact and is disposed to leave an uncovered cathode surface portion. Electrolyte layer 130, disposed on the uncovered cathode surface portion, and anode layer 140, electrically isolated from contact layer 120 and disposed on electrolyte layer 130, complete polygonal fuel cell 100. In operation, fuel gas flows over anode layer 140.

Anode layer 140 is disposed on electrolyte layer 130 such that polygonal fuel cell 100 has a polygonal cross section. Compared to a circular tubular design, the tubular shape of cathode layer 110 provides comparable gas sealing capability, while the polygonal cross section permits denser packing into fuel cell stacks.

As used herein, "polygonal" refers to the shape of a plane geometric polygon, optionally with rounded corners. While sharp-cornered polygons provide the highest power density, practical considerations of manufacturability and strength may favor rounded corners for some applications.

Figure 2:
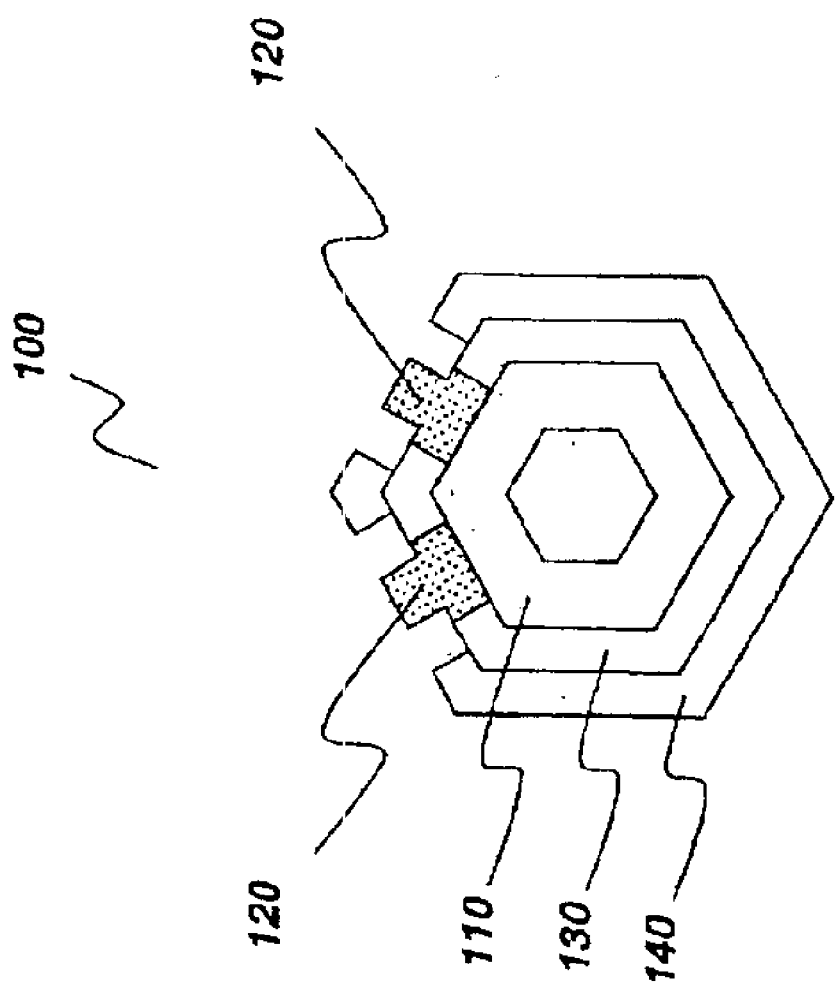
FIG. 2 illustrates an end view orthographic projection of the polygonal fuel cell in accordance with a more detailed embodiment of the embodiment illustrated in FIG. 1.

In accordance with a more detailed embodiment of the embodiment illustrated in FIG. 1, FIG. 2 illustrates an end view orthographic projection of polygonal fuel cell 100 wherein the polygonal cross section is an equilateral hexagon. FIG. 2 also illustrates a still more detailed embodiment of the embodiment illustrated in FIG. 1, in which polygonal fuel cell 100 comprises two contact layers 120 disposed on adjacent polygonal faces to facilitate stacking.

Figure 3:
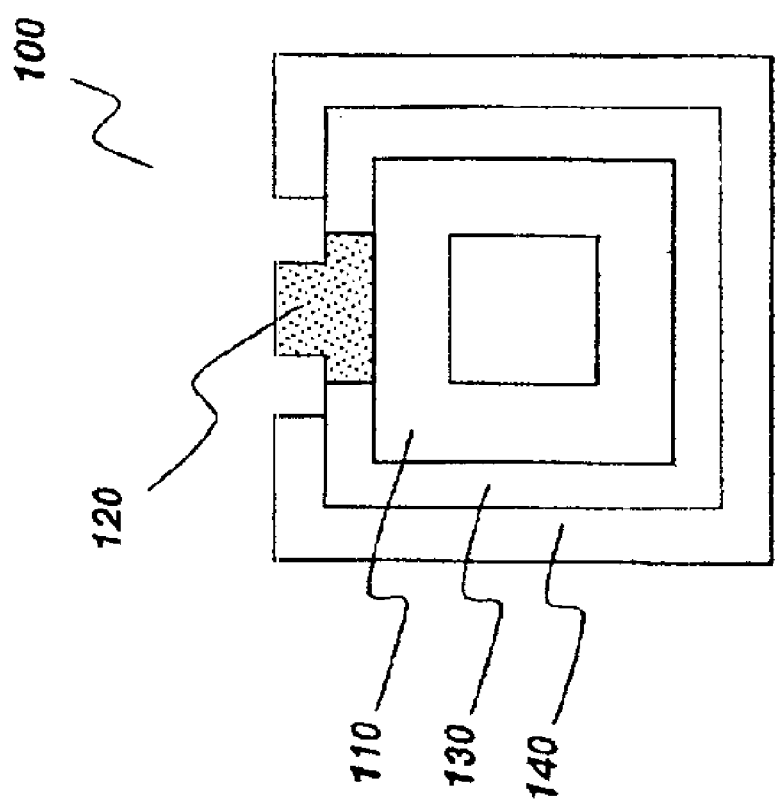
FIG. 3 illustrates an end view orthographic projection of the polygonal fuel cell in accordance with another more detailed embodiment of the embodiment illustrated in FIG. 1.

In accordance with another more detailed embodiment of the embodiment illustrated in FIG. 1, FIG. 3 illustrates an end view orthographic projection of polygonal fuel cell 100 wherein the polygonal cross section is a square (i.e., an equilateral rectangle).

Figure 4:
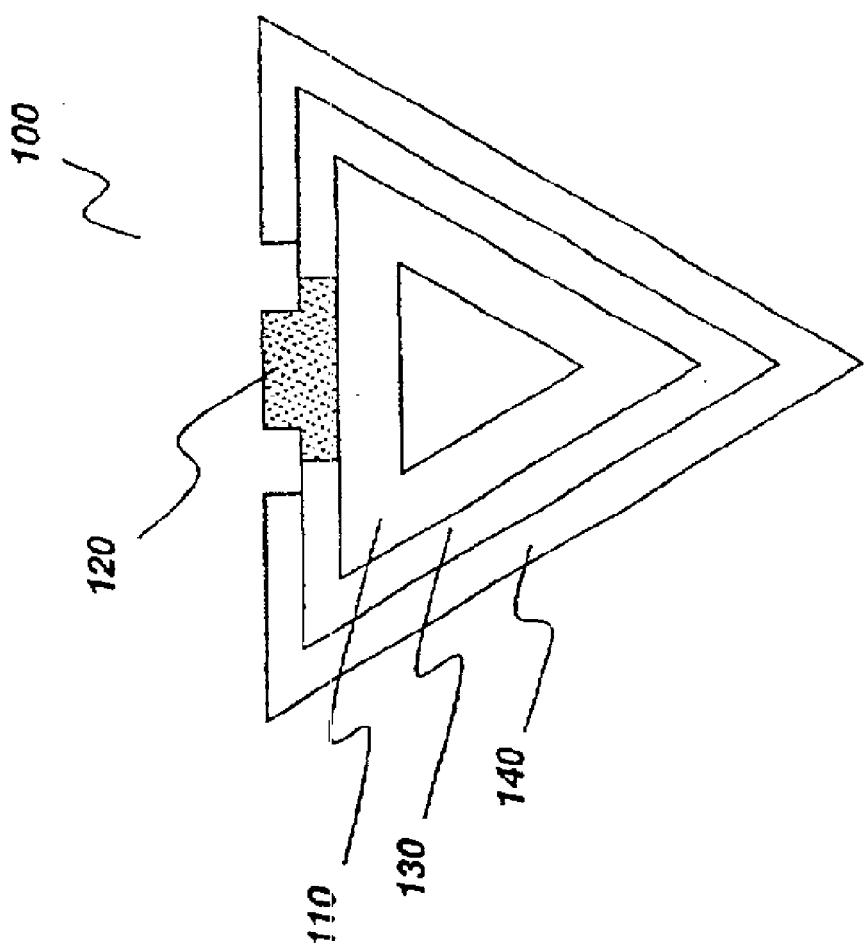
FIG. 4 illustrates an end view orthographic projection of the polygonal fuel cell in accordance with still another more detailed embodiment of the embodiment illustrated in FIG. 1.

In accordance with still another more detailed embodiment of the embodiment illustrated in FIG. 1, FIG. 4 illustrates an end view orthographic projection of polygonal fuel cell 100 wherein the polygonal cross section is an equilateral triangle.

Figure 5:
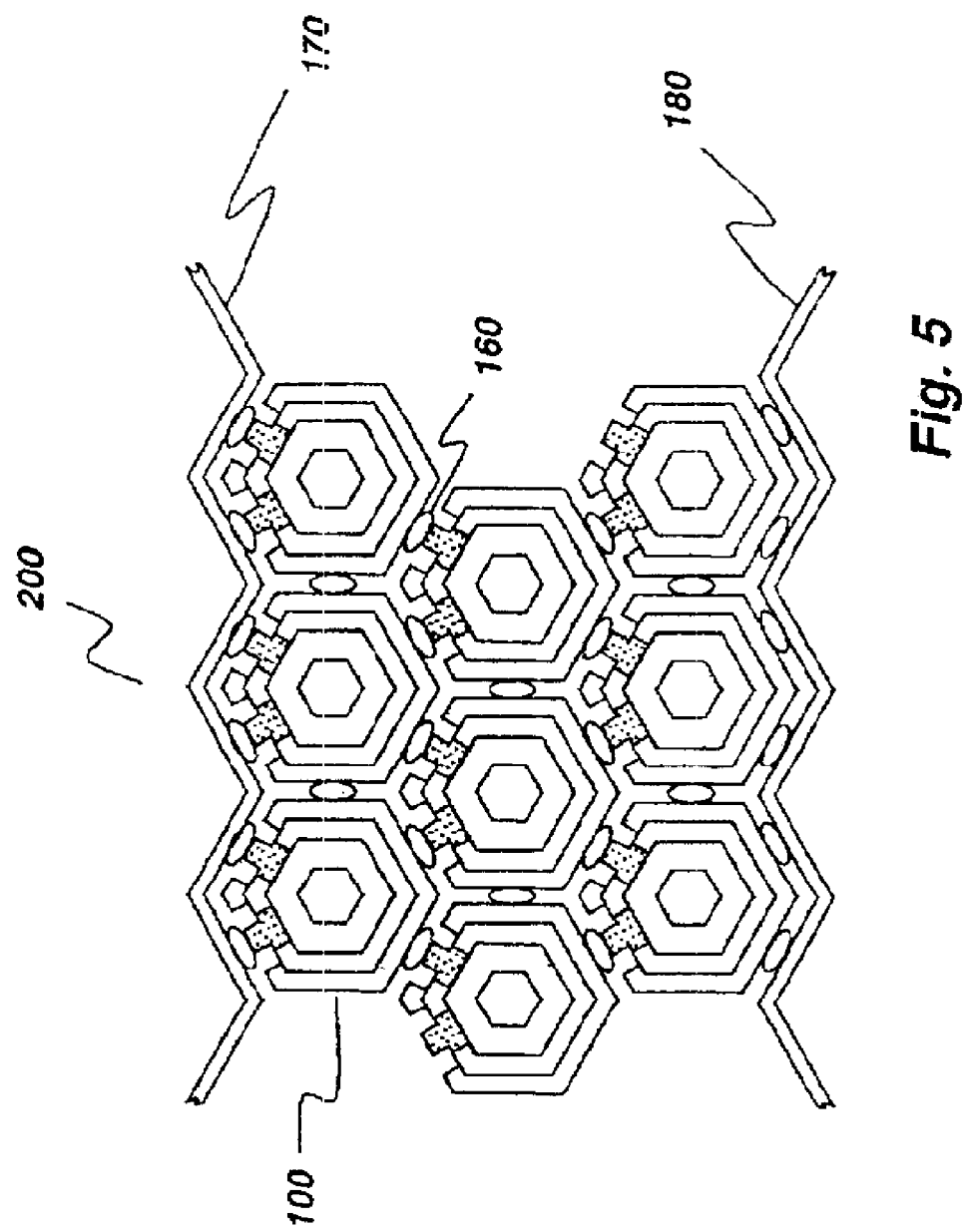
FIG. 5 illustrates an end view orthographic projection of a polygonal fuel cell stack in accordance with another embodiment of the present invention.

In accordance with another embodiment of the present invention, FIG. 5 illustrates an end view orthographic projection of a portion of a polygonal fuel cell stack 200 comprising: a plurality of polygonal fuel cells 100, a cathode bus 170, an anode bus 180, and a plurality of interconnection strips 160. As described above, polygonal fuel cells 100 comprise contact layers 110 and anode layers 140 and have a polygonal cross section to facilitate dense packing. Each polygonal fuel cell 100 produces a characteristic voltage rise and is capable of sourcing current only up to a safe individual cell current limit. In order to meat overall requirements of polygonal fuel cell stack 200. therefore, polygonal fuel cells 100 are electrically coupled in parallel to satisfy a current requirement and in series to satisfy a voltage requirement. Stack voltage is made available externally by electrically coupling cathode layers 110 to cathode bus 170 and by electrically coupling anode layers 140 to anode bus 180. cell-to-cell and cell-to-bus electrical coupling as achieved by interposing interconnection strips 160 there between. interconnection strips 160 also provide spacing among polygonal fuel cells 100 to permit gas flow over anode layers 140.

In a more specific embodiment, FIG. 5 also shows polygonal fuel cell stack 200 wherein the polygonal cross section is an equilateral hexagon and wherein each of polygonal fuel cells 100 comprises two of contact layers 120 disposed on adjacent polygonal faces.

Figure 6:
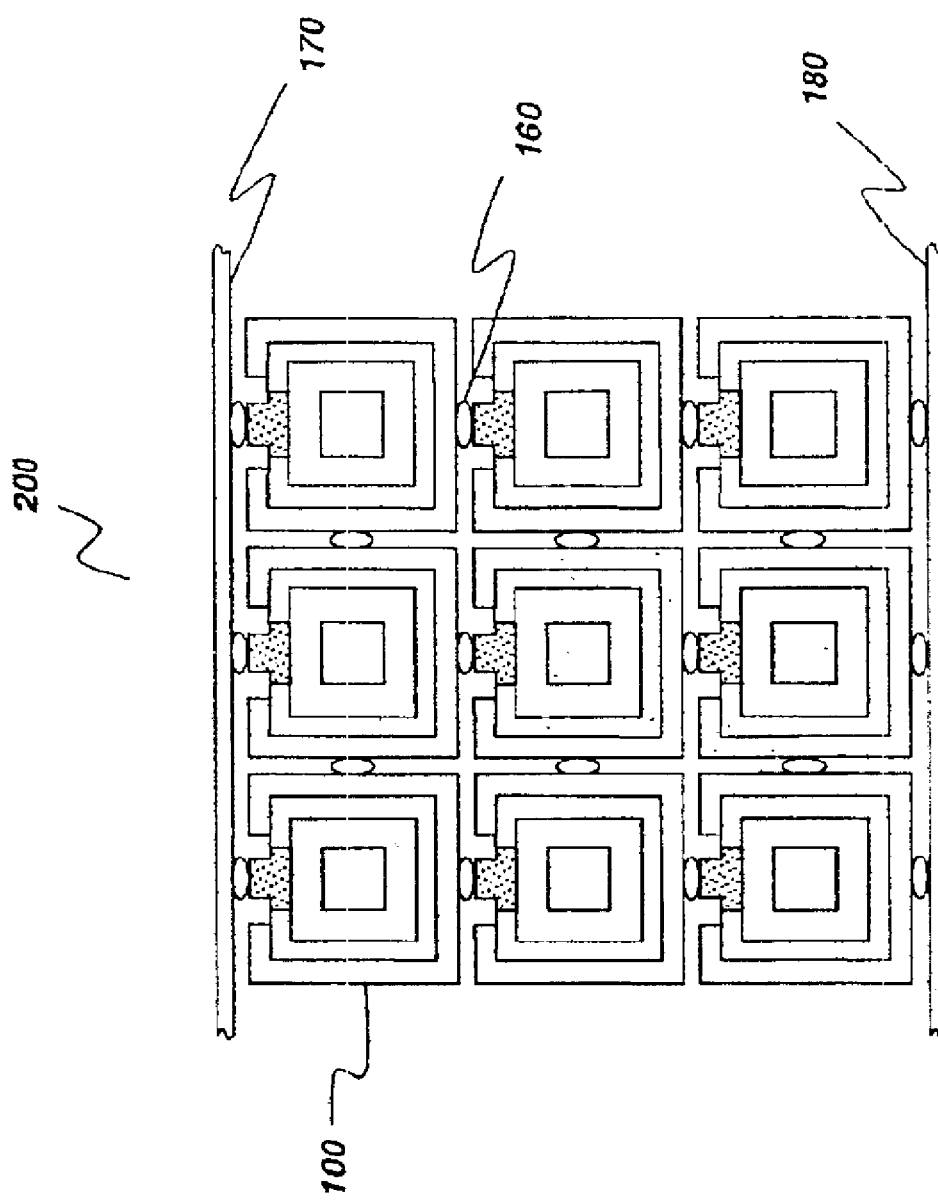
FIG. 6 illustrates an end view orthographic projection of a polygonal fuel cell stack in accordance with a more detailed embodiment of the embodiment illustrated in FIG. 5; and, FIG. 7 illustrates an end view orthographic projection of a polygonal fuel cell stack in accordance with another more detailed embodiment of the embodiment illustrated in FIG. 5.

In accordance with a more detailed embodiment of the embodiment illustrated in FIG. 5, FIG. 6 illustrates an end view orthographic projection of a polygonal fuel cell stack wherein the polygonal cross section is a square (i.e., an equilateral rectangle).

Figure 7:
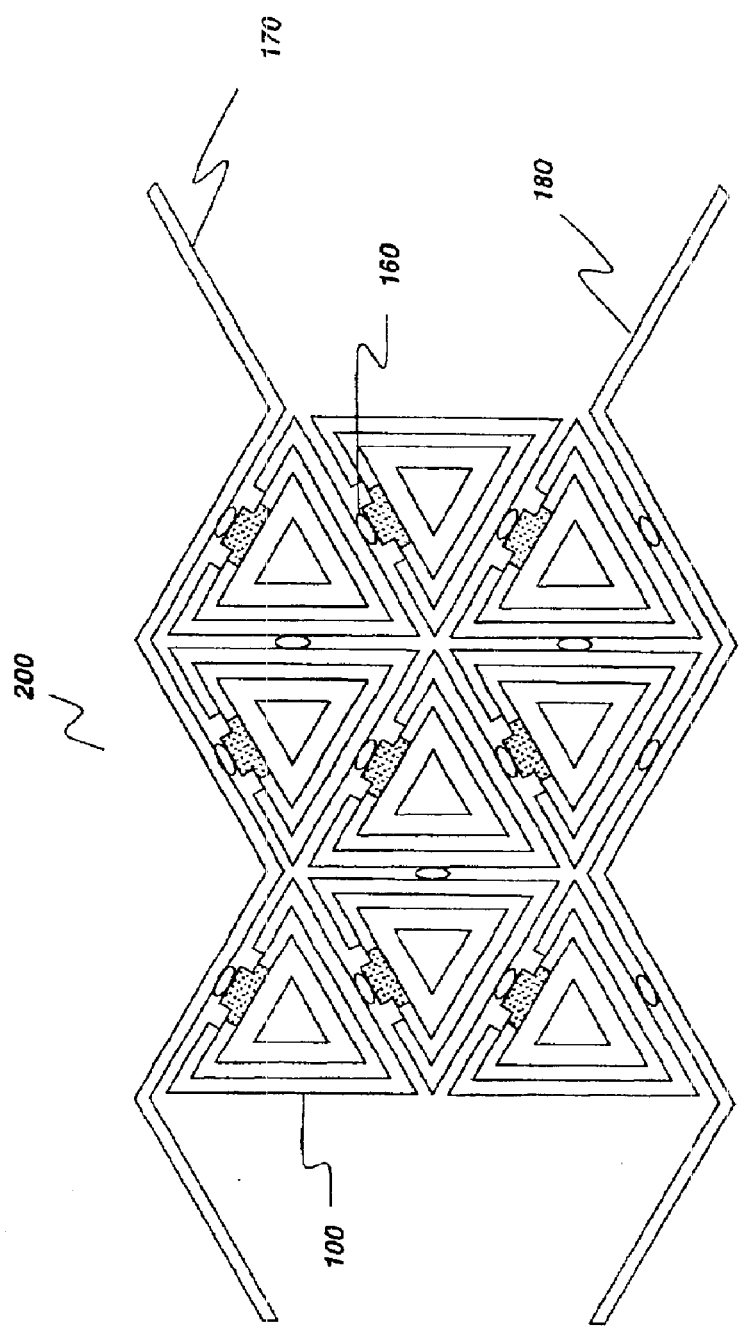

In accordance with another more detailed embodiment of the embodiment illustrated in FIG. 5, FIG. 7 illustrates an end view orthographic projection of a polygonal fuel cell stack wherein the polygonal cross section is an equilateral triangle.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A polygonal fuel cell comprising:
   a cathode layer having a tubular shape;
   a contact layer electrically coupled to and disposed on said cathode layer to leave an uncovered cathode surface portion;
   an electrolyte layer disposed on said uncovered cathode surface portion: and
   an anode layer electrically isolated from said contact layer, disposed on said electrolyte layer such that said polygonal fuel cell has a polygonal cross section.

2. The polygonal fuel cell of claim 1 wherein said polygonal cross section is selected from the group consisting of triangles, rectangles, and hexagons.

3. The polygonal fuel cell of claim 1 wherein said polygonal cross section is equilateral.

4. The polygonal fuel cell of claim 1 comprising two of said contact layers disposed on adjacent polygonal faces, wherein said polygonal cross section is a hexagon.

5. A polygonal fuel cell comprising:
   a cathode layer having a tubular shape;
   a contact layer electrically coupled to and disposed on said cathode layer to leave an uncovered cathode surface portion;
   an electrolyte layer disposed on said uncovered cathode surface portion; and
   an anode layer electrically isolated from said contact layer, disposed on said electrolyte layer such that said polygonal fuel cell has a polygonal cross section selected from the group consisting of equilateral triangles, squares, and hexagons.

6. The polygonal fuel cell of claim 5 comprising two of said contact layers disposed on adjacent polygonal faces, wherein said polygonal cross section is a hexagon.

7. A polygonal fuel cell stack comprising:
   a plurality of polygonal fuel cells comprising contact layers and anode layers, having a polygonal cross section, and being adapted to be electrically coupled in parallel to satisfy a current requirement and in series to satisfy a voltage requirement;
   a cathode bus adapted to electrically couple said contact layers;
   an anode bus adapted to electrically couple said anode layers; and
   a plurality of interconnection strips adapted to electrically couple said polygonal fuel cells, said cathode bus, and said anode bus.

8. The polygonal fuel cell stack of claim 7 wherein said polygonal cross section as selected from the group consisting of triangles, rectangles, and hexagons.

9. The polygonal fuel cell stack of claim 7 wherein said polygonal cross section is equilateral.

10. The polygonal fuel cell stack of claim 7 wherein each of said polygonal fuel cells comprises two of said contact layers disposed on adjacent polygonal faces, wherein said polygonal cross section is a hexagon.

11. A polygonal fuel cell stack comprising:
    a plurality of polygonal fuel cells comprising contact layers and anode layers, having a polygonal cross section, and being adapted to be electrically coupled in parallel to satisfy a current requirement and in series to satisfy a voltage requirement;
    a cathode bus adapted to electrically couple said contact layers;
    an anode bus adapted to electrically couple said anode layers; and
    a plurality of interconnection strips adapted to electrically couple said polygonal fuel cells, said cathode bus, and said anode bus.
    said polygonal cross section being selected from the group consisting of equilateral triangles, squares, and equilateral hexagons.

12. The polygonal fuel cell stack of claim 11 wherein:
    each of said polygonal fuel cells comprises two of said contact layers disposed on adjacent polygonal faces; and said polygonal cross section is a hexagon.

13. A method of making a polygonal fuel cell comprising:
    providing a cathode layer having a tubular shape;
    electrically coupling arid disposing a contact layer on said cathode layer to leave an uncovered cathode surface portion;
    disposing an electrolyte layer on said uncovered cathode surface portion; and
    disposing an anode layer, electrically isolated from said contact layer, on said electrolyte layer such that said polygonal fuel cell has a polygonal cross section.

14. The method of claim 13 wherein said polygonal cross section is selected from the group consisting of triangles, rectangles, and hexagons.

15. The method of claim 13 wherein said polygonal cross section is equilateral.

16. The method of claim 13 wherein electrically coupling and disposing a contact layer on said cathode layer comprises electrically coupling and disposing two of said contact layers on adjacent polygonal faces, wherein said polygonal cross section is a hexagon.

17. A method of making a polygonal fuel cell comprising:
    providing a cathode layer having a tubular shape;
    electrically coupling and disposing a contact layer on said cathode layer to leave an uncovered cathode surface portion;
    disposing an electrolyte layer on said uncovered cathode surface portion; and
    disposing an anode layer, electrically isolated from said contact layer, on said electrolyte layer such that said polygonal fuel cell has a polygonal cross section selected from the group consisting of equilateral triangles, squares, and equilateral hexagons.

18. The method of claim 17 wherein:

electrically coupling and disposing a contact layer on said cathode layer comprises electrically coupling and disposing two of said contact layers on adjacent polygonal faces; and said polygonal cross section is a hexagon.

19. A method of making a polygonal fuel cell stack comprising:

electrically coupling a plurality of polygonal fuel cells, in parallel to satisfy a current requirement, in series to satisfy a voltage requirement, by interposing a plurality of interconnection strips therebetween, said polygonal fuel cells comprising contact layers and anode layers and having a polygonal cross section;

electrically coupling a cathode bus to said contact layers by interposing a plurality of interconnection strips therebetween; and electrically coupling an anode bus to said anode layers by interposing a plurality of interconnection strips therebetween.

20. The method of claim 19 wherein said polygonal cross section is selected from the group consisting of triangles, rectangles, and hexagons.

21. The method of claim 19 wherein said polygonal cross section is equilateral.

22. The method of claim 19 wherein:

each of said polygonal fuel cells comprises two of said contact layers disposed on adjacent polygonal faces; and said polygonal cross section is a hexagon.

23. A method of making a polygonal fuel cell stack comprising:

electrically coupling a plurality of polygonal fuel cells, in parallel to satisfy a current requirement, in series to satisfy a voltage requirement, by interposing a plurality of interconnection strips therebetween, said polygonal fuel cells comprising contact layers and anode layers and having a polygonal cross section;

electrically coupling a cathode bus to said contact layers by interposing a plurality of interconnection strips therebetween; and electrically coupling an anode bus to said anode layers by interposing a plurality of interconnection strips therebetween.

said polygonal cress section being selected from the group consisting of equilateral triangles, squares, and equilateral hexagons.

24. The method of claim 23 wherein:

each of said polygonal fuel cells comprises two of said contact layers disposed on adjacent polygonal faces; and said polygonal cross section is a hexagon.

* * * * *